Feb. 22, 1927.　　　B. J. GIESE　　　1,618,425
HEADLIGHT
Filed Aug. 28, 1925
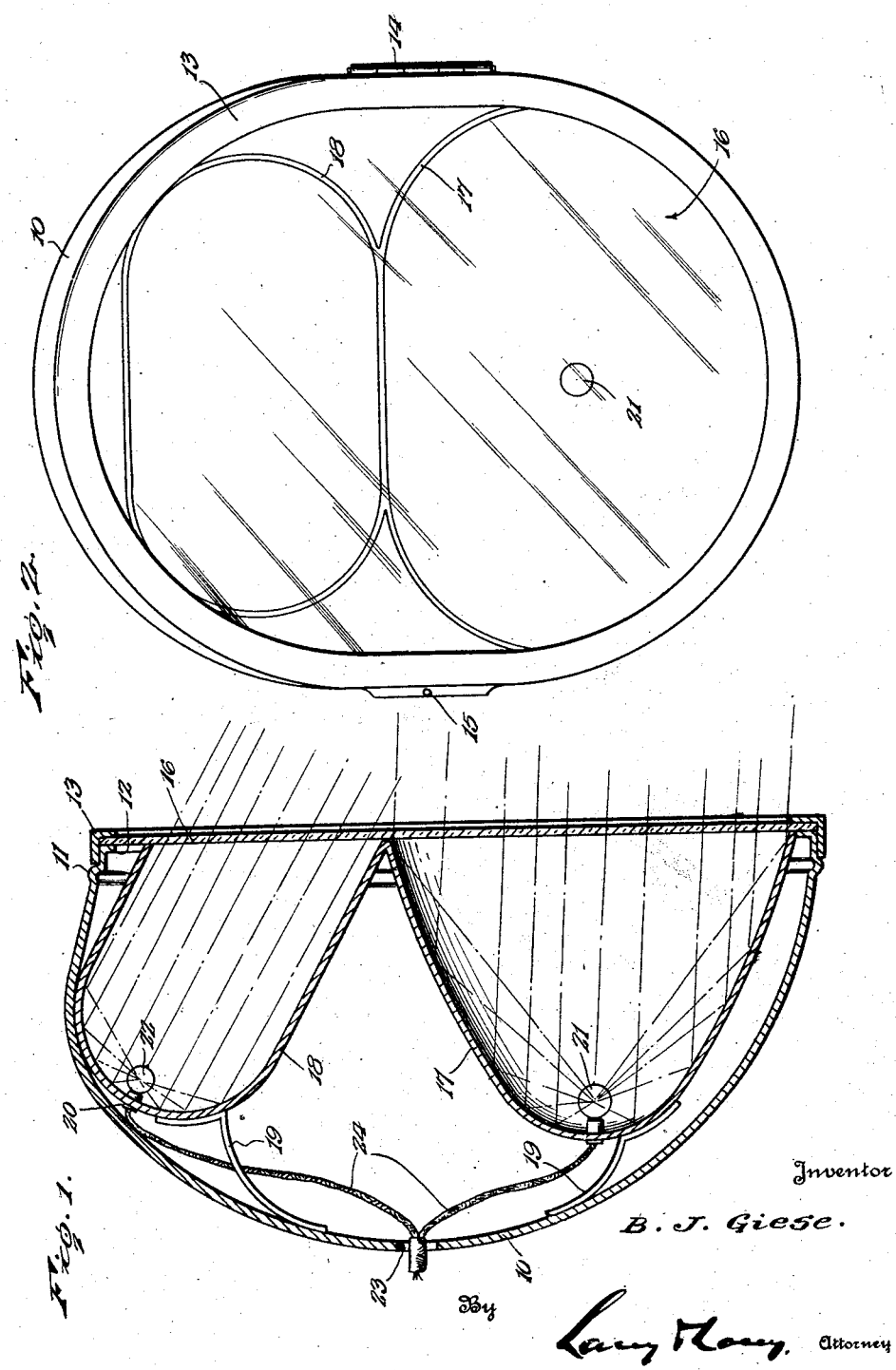
Inventor
B. J. Giese.

Patented Feb. 22, 1927.

1,618,425

UNITED STATES PATENT OFFICE.

BARNEY J. GIESE, OF OCONTO, WISCONSIN.

HEADLIGHT.

Application filed August 28, 1925. Serial No. 53,157.

This invention relates to an improved headlight and while being well adapted for general use is, nevertheless, especially designed to be employed in connection with motor vehicles.

The invention seeks, among other objects, to provide a headlight embodying a long vision lamp for illuminating the roadway a considerable distance ahead, and a short vision lamp for illuminating the roadway directly in front of the vehicle so that headlight glare may be avoided by extinguishing the long vision lamp and energizing the short vision lamp.

The invention seeks, as a further object, to provide a headlight having a reflector embodying a pair of reflecting shells, and wherein the short vision lamp will be mounted in its shell in such manner that said lamp will be hidden from the view of an approaching motorist for thus obviating headlight glare.

A still further object of the invention is to provide a headlight wherein, by employing separate shells for the lamps and mounting the short vision lamp in the manner indicated, lamps of like candle power may be employed.

And the invention seeks, as a still further object, to provide a reflector of novel construction as well as to provide a novel mounting for the reflector.

Other objects of the invention not specifically mentioned will appear in the course of the following description.

In the accompanying drawings:

Figure 1 is a vertical sectional view taken medially through my improved headlight.

Figure 2 is a front elevation of the device.

In carrying the invention into effect, I employ a casing 10 which, as shown in Figure 2, is of elliptical shape at its front end while, as brought out in Figure 1, the wall of the casing is rounded at the back of the casing. Pressed outwardly from the wall of the casing near the front end thereof, is an encircling bead or shoulder 11, and formed on said wall to project within the open end of the casing is an inturned flange 12. Normally closing the casing is a door having a frame 13 which is angle-shaped in cross section, and suitably connecting the frame with the casing 10 at one side thereof is an appropriate hinge 14 while a suitable catch 15 is provided at the side of the frame opposite the hinge for normally securing the door closed. As brought out in Figure 1, the frame is adapted to fit over the casing at the forward end thereof to abut the shoulder 11 so that the frame and said shoulder will cooperate to provide a closed joint for excluding the entrance of moisture into the casing, and appropriately fixed in the frame is a front pane 16 disposed to abut the flange 12 of the casing when the door is closed.

Housed within the casing is a compound reflector embodying a pair of superposed shells 17 and 18 which, preferably, are integrally connected with each other. The shell 17 is conoidal in shape, as seen in vertical longitudinal section but is flattened transversely so that, as shown in Figure 2, the forward end of the shell is of elliptical contour. The shell 18 is disposed at an acute angle with respect to the shell 17 and is somewhat smaller than the latter shell. As brought out in Figure 1, the axis of the shell 18 slopes downwardly and forwardly toward the axis of the shell 17, and the shell 18 is also flattened transversely so that the front end thereof is of elliptical contour. The major axis of the elliptical front end of the casing 10 is disposed vertically while the major axes of the shells 17 and 18 are disposed horizontally. The shells are thus formed to afford a greater spread to the beams of light reflected from said shells for better illuminating the sides of the roadway. At their front edges, the shells abut the front pane 16 and fixed at corresponding ends thereof to the rear portions of said shells are flat springs 19. The opposite ends of the springs are suitably fixed to the wall of the casing 10 at its rear portion and, preferably, said springs are bowed longitudinally for yieldably supporting the reflector within the casing and yieldably maintaining the front edges of the shells 17 and 18 tight against the front pane. Extending through the walls of said shells at the rear thereof, are suitable axially disposed sockets 20 in which are removably mounted lamps 21 and 22 and, preferably, these lamps are of like candle power. Extending through an opening 23 at the rear of the casing 10 are suitable circuit wires 24 which are attached to the sockets 20 for supplying the lamps 21 and 22 with current and, preferably, said lamps are in separate circuits so that the lamps may be individually controlled by separate switches.

The shell 17 is directed straight ahead, or approximately so, and will accordingly reflect the rays from the lamp 21 forwardly for illuminating the roadway a long distance ahead. The lamp 21, therefore, provides a long vision lamp and is used for ordinary driving. However, when meeting an oncoming motorist, the lamp 21 is extinguished and the lamp 22 energized. Since the shell 18 is directed downwardly at an acute angle, the rays from the lamp 22 will be reflected against the roadway close at the front of the vehicle and it is now to be observed that the lamp 22 is mounted above a plane touching the forward edge of the shell 17 at its upper side. Accordingly, said lamp will be hidden by the upper portion of said shell from the view of the approaching motorist so that such motorist will experience no headlight glare while the rays from the lamp 22 will, since said lamp is of a candle power equal to the candle power of the lamp 21, amply illuminate the roadway directly at the front of the vehicle so that the vehicle may be driven with safety.

Having thus described the invention, what I claim is:

A headlight including a casing having an elliptical front end disposed with its major axis arranged vertically, reflectors housed within the casing and including superposed conical shells flattened at their forward ends to elliptical shape with the major axes of the forward ends of said shells disposed horizontally, the lower shell being positioned with its axis horizontal to effect illumination a distance ahead and the upper shell extending forwardly at a downward incline to effect illumination only a short distance at the front of the headlight, and lamps mounted within the shells with the lamp in the upper shell disposed above the plane of the upper edge of the forward end of the shell.

In testimony whereof I affix my signature.

BARNEY J. GIESE. [L. S.].